No. 800,678. PATENTED OCT. 3, 1905.
C. PLUMMER.
LIQUID HEATING ATTACHMENT FOR LAMPS.
APPLICATION FILED NOV. 7, 1904.
2 SHEETS—SHEET 1.
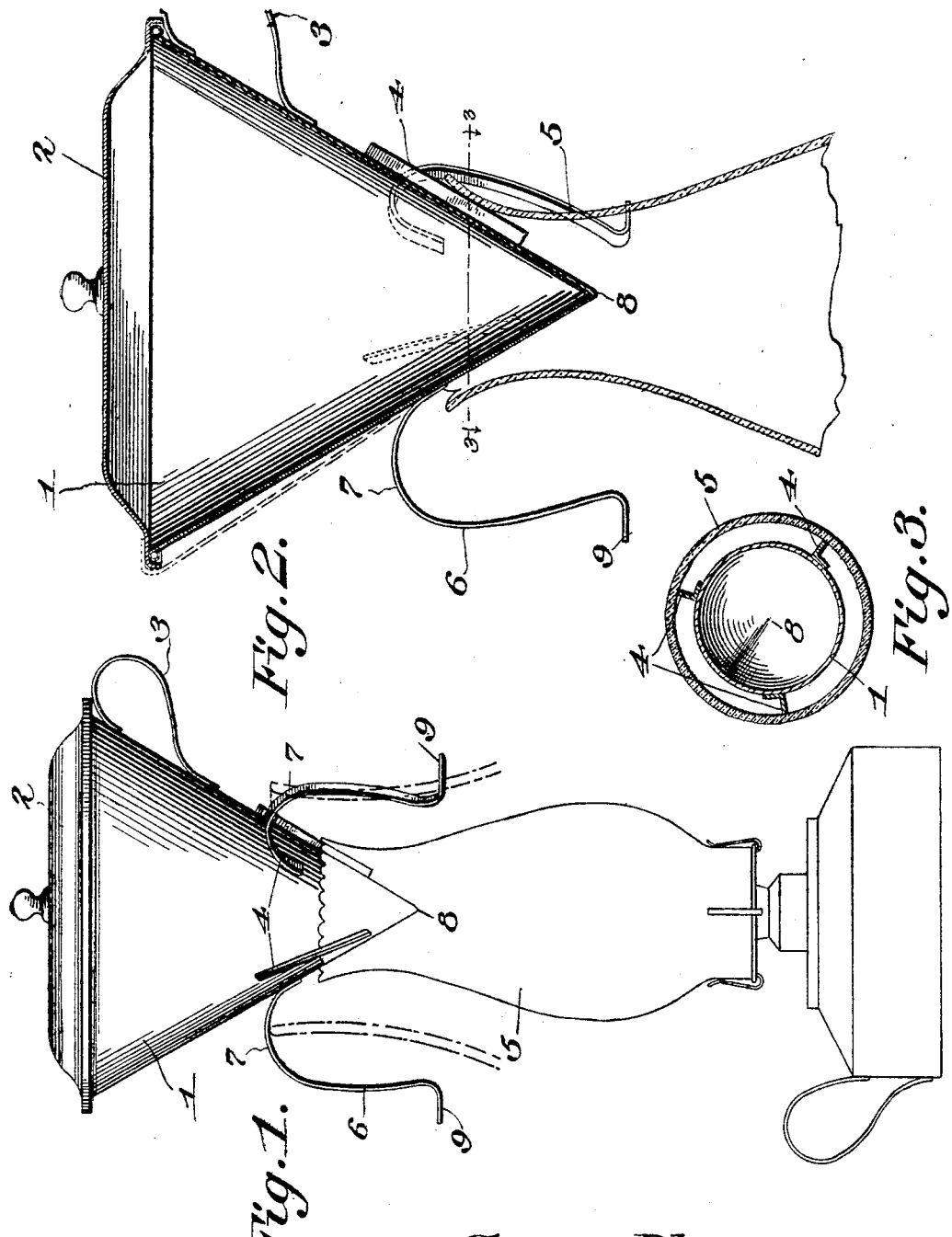
Cyrus Plummer, Inventor.
Witnesses

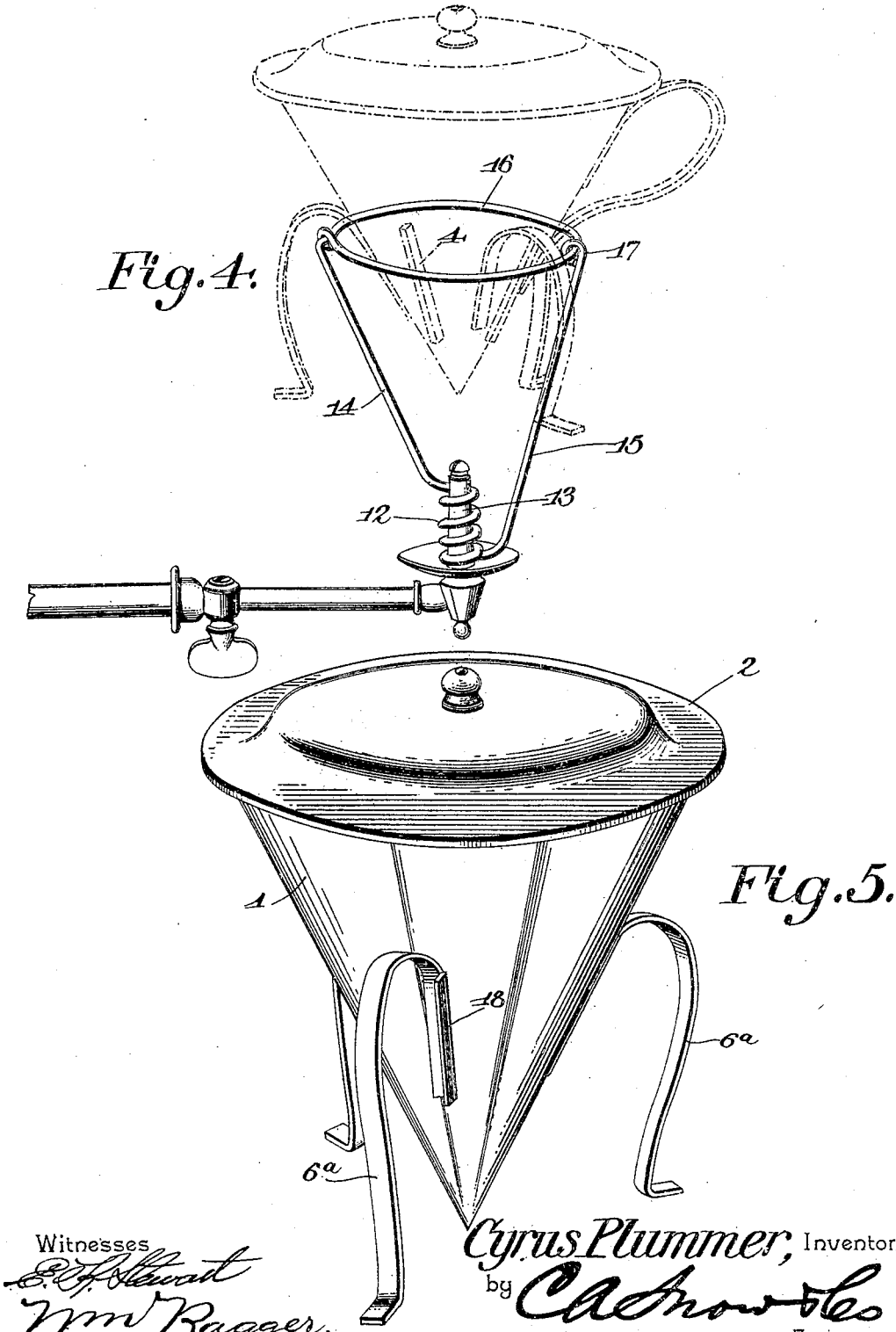

UNITED STATES PATENT OFFICE.

CYRUS PLUMMER, OF FLEMINGSBURG, KENTUCKY.

LIQUID-HEATING ATTACHMENT FOR LAMPS.

No. 800,678.　　　　Specification of Letters Patent.　　　　Patented Oct. 3, 1905.

Application filed November 7, 1904. Serial No. 231,801.

*To all whom it may concern:*

Be it known that I, CYRUS PLUMMER, a citizen of the United States, residing at Flemingsburg, in the county of Fleming and State of Kentucky, have invented a new and useful Liquid-Heating Attachment for Lamps, of which the following is a specification.

This invention relates to attachments for lamps in which various liquids, such as water or milk, may be quickly and conveniently heated without danger of their breaking the lamp-chimney or causing smoke or other similar annoyance; and it has for its object to provide a device of this class which shall possess superior advantages in point of simplicity, durability, and general efficiency.

With these and other ends in view, which will readily appear as the nature of the invention becomes more perfectly understood, the same consists in the improved construction and novel arrangement and combination of parts, hereinafter fully described and particularly pointed out in the claims.

In the accompanying drawings has been illustrated a simple and preferred form of embodiment of the invention, it being understood, however, that no limitation is made to the precise structural details therein exhibited, but that the right is reserved to any changes, alterations, and modifications which come fairly within the scope of the invention and which may be resorted to without departing from the spirit or sacrificing any of the advantages of the same.

In said drawings, Figure 1 is a side elevation illustrating the device which constitutes the invention supported in operative position upon the chimney of an ordinary lamp. Fig. 2 is a vertical sectional view showing the device supported upon a table. Fig. 3 is a horizontal sectional view taken on the line 3 3 in Fig. 2. Fig. 4 is a perspective view showing the device applied to a gas-jet in position for operation. Fig. 5 is a perspective view illustrating a modification.

Corresponding parts in the several figures are indicated by similar numerals of reference.

The device which is the subject of this invention includes a pointed or inverted conical vessel or receptacle 1, having a lid 2 and a handle 3. This vessel, which is made of suitable dimensions to enable its lower pointed end to be fitted within a lamp-chimney of ordinary size, is provided with exteriorly-disposed flanges 4, of which three or more may be used for the purpose of spacing the vessel from the lamp-chimney 5 sufficiently to permit the gases of combustion to pass between the walls of the vessel and the top edge of the chimney. Suitably secured to the outside of the vessel are a plurality of legs 6, preferably three in number, the upper ends of which are arched, as shown at 7, to a point at which they will be removed from any possibility of contact with the lamp-chimney upon which the device is used. The lower ends of said legs may be extended slightly below the level apex 8 of the vessel 1, and they may be bent to form feet 9.

The operation and advantages of this device will be evident from the foregoing description, taken in connection with the drawings. When the device is supported upon a lamp-chimney, the flanges 4 will space the vessel 1 from the upper edge of the chimney sufficiently to form ample room for the passage of the gases of combustion, thereby avoiding "smoking" of either the lamp-chimney or the exterior of the vessel. The contents of the latter will become rapidly heated owing to the fact that it will be surrounded on all sides by the hot gases of combustion issuing from the lamp-chimney. As soon as the contents of the vessel have been heated to the desired point the vessel may be removed and supported by the legs 6 in such a manner that it cannot possibly become tilted or upset. Said legs, it will be observed, have during the heating operation been suspended or supported at a distance from the lamp-chimney, and possibility of overheating said legs is thereby avoided, so that the device may be safely placed upon a table without danger of scorching or marring the latter.

The device is extremely simple and inexpensive and its utility for the purpose indicated will be apparent.

When the device is to be shipped, the legs 6 may be bent upward against the walls of the receptacle 1, with the feet 9 overhanging the lid 2, which will thus be temporarily secured in position, this position of the legs being indicated in dotted lines in Fig. 2 of the drawings.

When the device is to be used in connection with or is to be supported upon a lamp-chimney of great and unusual size, it may be so supported by the arched portion of the legs 6, as illustrated in dotted lines in Fig. 1 of the drawings. When the vessel is thus supported, it will be spaced from the upper edge of the lamp-chimney sufficiently to admit of the passage of the gases of combustion, as will be readily understood.

The device is capable of being successfully used not only in connection with a lamp, but in connection with a gas-jet as well. When it is to be thus used, it is necessary, however, to provide a holding device or bracket, which has been illustrated in Fig. 4 of the drawings, where the device has been shown as applied in operative position to an ordinary gas-bracket. In this figure 12 designates a wire coil adapted to fit upon a burner 13, said coil terminating in upwardly-extending divergent arms 14 and 15, one of which, 14, is twisted at its upper end to form a ring 16, with which the upper end of the arm 15 is connected by means of an eye 17. This device, it will be observed, may be readily placed in position upon any ordinary gas-burner and will serve to sustain in position the liquid-heating device, which has been shown in dotted lines in Fig. 4.

Under a modification of the invention which has been illustrated in Fig. 5 of the drawings the legs, here designated 6ª, are provided upon the parts thereof which are secured to the side walls of the conical vessel 1 with outwardly-extending flanges 18, which are integral therewith and which take the place and perform the function of the flanges 4 shown in the remaining figures. This construction is to be usually preferred on the ground of its greater simplicity and the consequent reduction of the expense of manufacture. The precise manner of forming the flange 18 integral with the leg may be varied without departing from the spirit of the invention.

Having thus described my invention, I claim—

1. A heating attachment for lamps comprising a conical vessel, a lid and a handle for the same, bendable legs connected exteriorly with the vessel and terminating in supporting-feet, and spacing-flanges connected exteriorly with the vessel and adapted to engage the top rim of a lamp-chimney.

2. A liquid-heating device consisting of a conical vessel, and legs or supporting members secured exteriorly to said vessel, said legs being provided with integral flanges extending outwardly upon the wall of the vessel.

In testimony that I claim the foregoing as my own I have hereto affixed my signature in the presence of two witnesses.

CYRUS PLUMMER.

Witnesses:
    E. H. TAYLOR,
    A. C. MILLER.